United States Patent
Johnston

[15] 3,698,172
[45] Oct. 17, 1972

[54] CROP ENGAGING TINE MEANS
[72] Inventor: Edward J. Johnston, La Grange, Ill.
[73] Assignee: International Harvester Company, Chicago, Ill.
[22] Filed: Aug. 31, 1970
[21] Appl. No.: 68,284

[52] U.S. Cl. ................................................56/400
[51] Int. Cl. ............................................A01d 77/00
[58] Field of Search..................56/400, 400.21, 400.2

[56] References Cited

UNITED STATES PATENTS

| | | | |
|---|---|---|---|
| 3,261,153 | 7/1966 | Johnston | 56/400 |
| 3,186,153 | 6/1965 | Breed | 56/400 |
| 2,953,830 | 9/1960 | MacRae | 56/400 X |

*Primary Examiner*—Louis G. Mancene
*Assistant Examiner*—J. N. Eskovitz
*Attorney*—Floyd B. Harman

[57] ABSTRACT

A crop-engaging tine assembly comprising a U-shaped clip having an upwardly projecting lug on its front portion and a pair of upwardly projecting bendable ears on the rear portion. The lug has a hole therein for a bolt which extends through aligned openings in a support bar. The headed or nut end of the bolt assembly engages the external side of the lug and the other end of the bolt assembly engages the bar and nests between the ears which embrace the bar with the lug to prevent turning. A method of fabricating the clip by cutting with a single shear the lug of the front portion of one lug and the notch in the rear portion of the next clip to form the ears so that there is no waste of material and a single cut accomplishes both.

7 Claims, 10 Drawing Figures

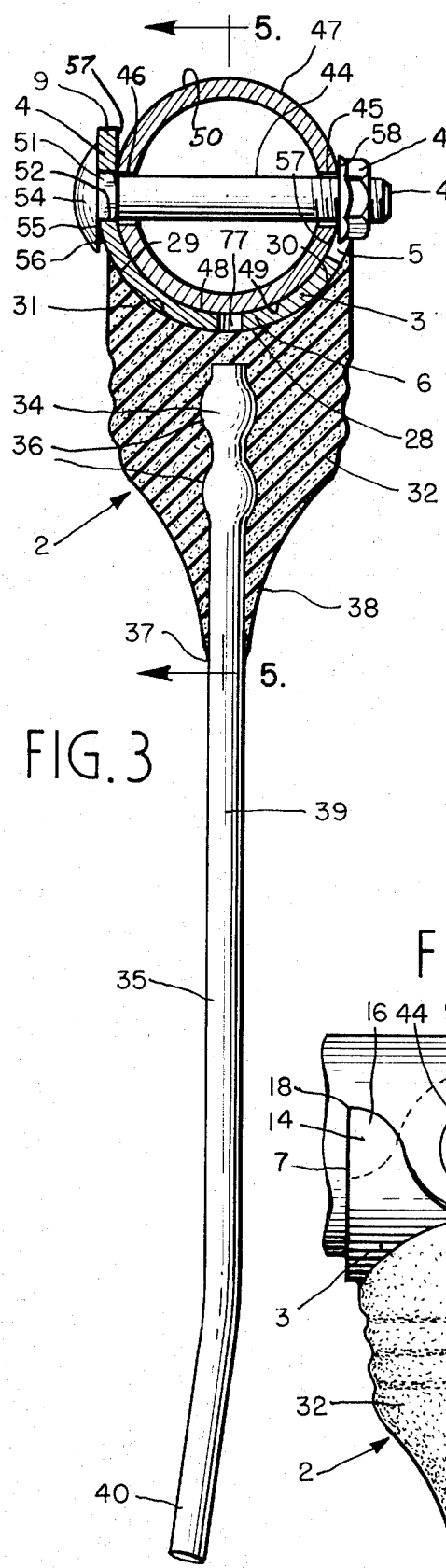
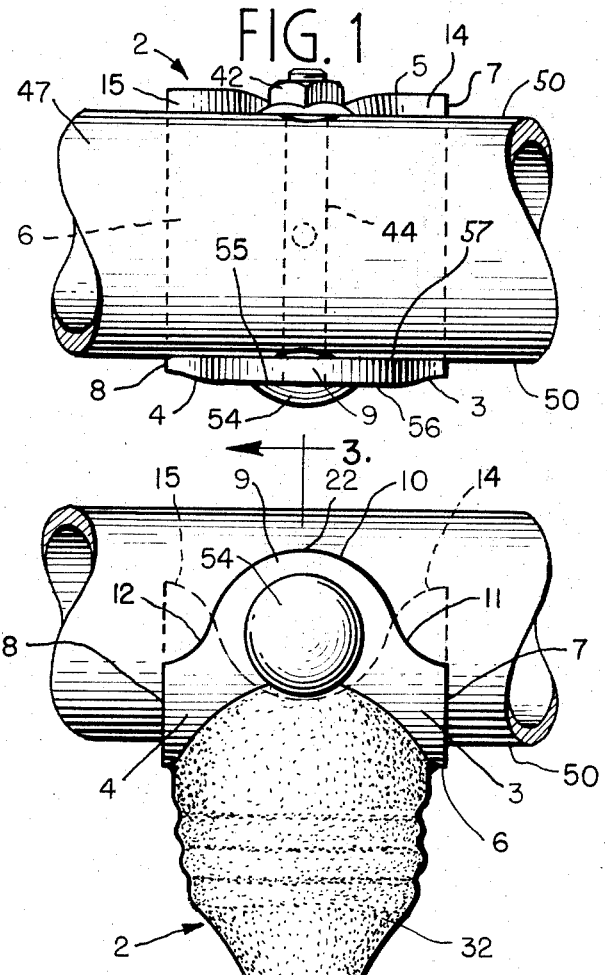
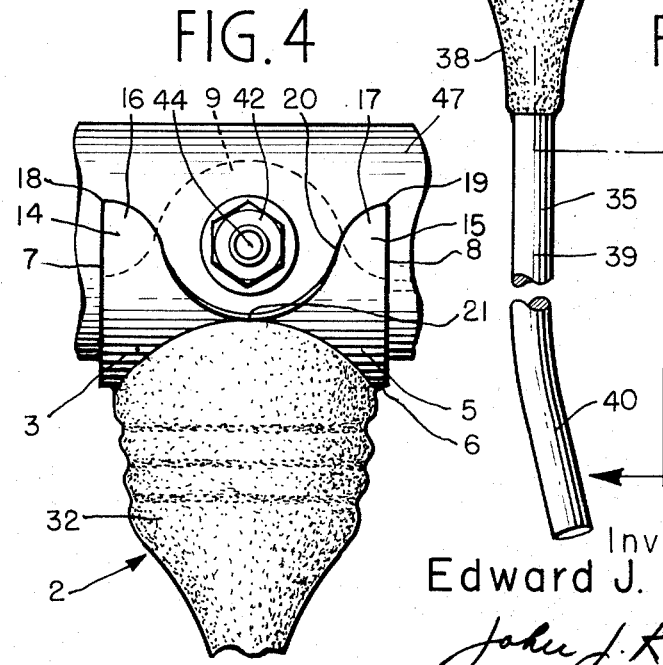

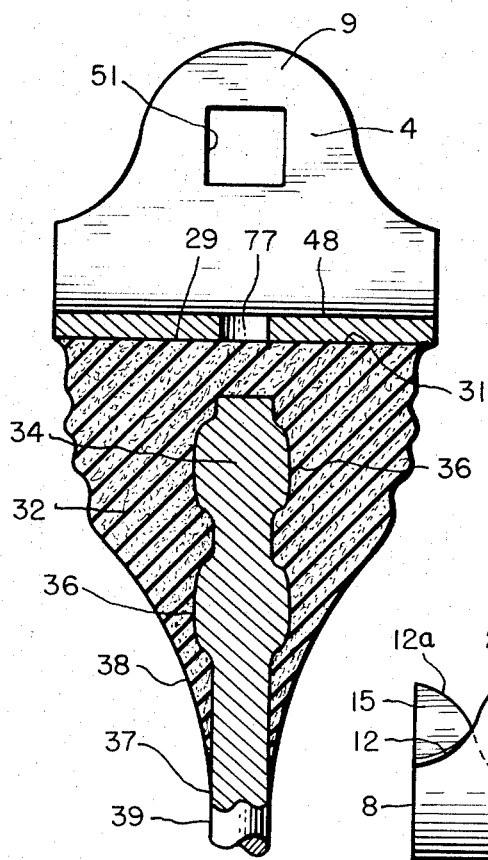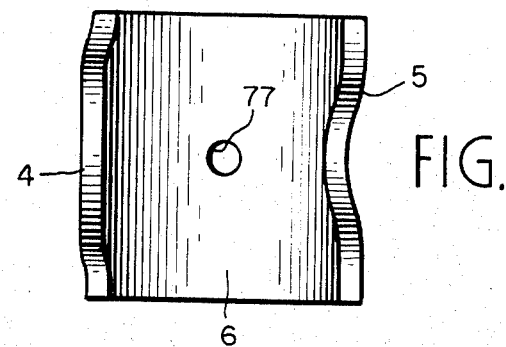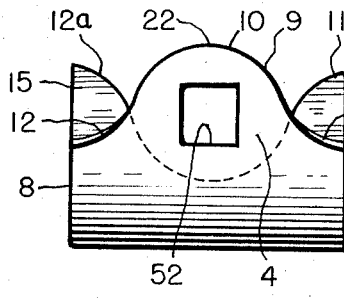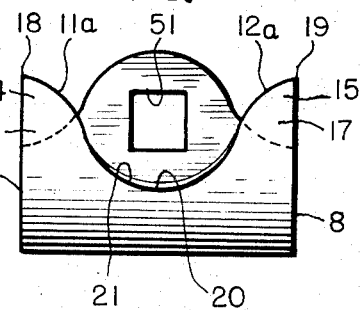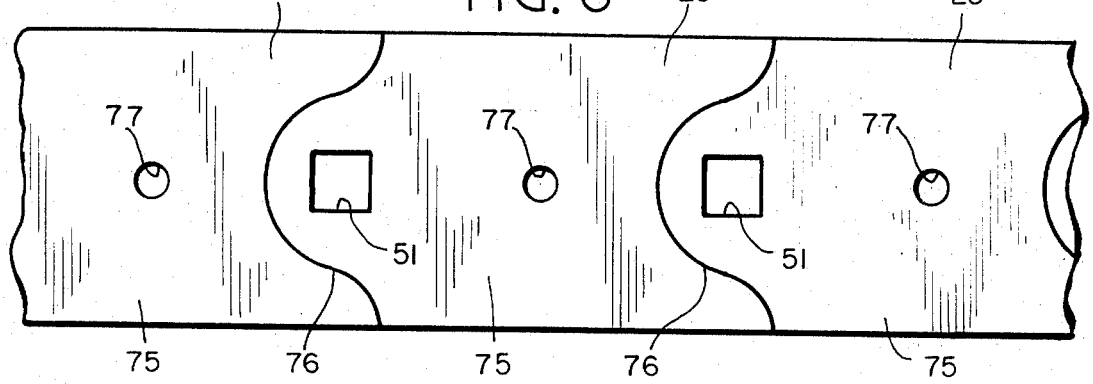

CROP ENGAGING TINE MEANS

DISCUSSION OF THE PRIOR ART

The clips for attaching rubber mounted rake teeth to a cylindrical rake bar as have been heretofore made are such that they have been difficult to shape to the bar particularly where it is distorted from cylindrical shape upon punching holes in the bar. The common practice has been to punch a hole in the center of the front and rear portion of a U-shaped clip and align these holes with the holes in the bar. Unless particular care is exercised there are many instances where the shape of the U does not match the shape of the bar in the attachment area and thus the holes in the clip do not line up with the holes in the bar in that the bight portion is too shallow or if such bight portion is of greater depth than necessary, a gap is left between the bight and the bar so that the entire tooth assembly pendulates about the mounting bolt lengthwise of the mounting bar. Since the tooth normally operates between strippers, the tooth in such loose assemblies scrapes against the edges of the strippers wearing away the tooth and the strippers.

SUMMARY OF THE INVENTION

This invention is directed to a rake tooth mounting wherein the clip is so formed that the bolt holds only the front part against the bar and wherein the rear parts are bendable to conform to the shape of the bar.

A general object of the invention is to provide a novel rake tooth mounting which is easy to apply and wherein only one bolt hole is provided in the clip so that it is simple to align with the holes in the bar.

A further object is to provide a novel clip which obviates the problem of a shallow bight as aforesaid.

A still further object is to devise a clip which may be inexpensively manufactured from a strip of steel wherein the front portion of the first clip cut from the strip fits into the cut out in the rear portion of the next clip, the cut out forming a pair of ears on the rear of the next clip.

A still further object is to devise a novel method for making such clips in a continuous, inexpensive operation.

These and other objects and advantages inherent in and encompassed by the invention will become more readily apparent from the specifications and the drawings, wherein:

FIG. 1 is a top end view of the novel crop-engaging tine assembly;

FIG. 2 is a front view thereof shown mounted on an associated support bar;

FIG. 3 is a cross-sectional view thereof taken substantially on line 3—3 of FIG. 2;

FIG. 4 is a rear view of the assembly shown in FIG. 2;

FIG. 5 is an enlarged fragmentary cross-sectional view of the tine assembly taken substantially on the line 5—5 of FIG. 3;

FIG. 6 is a top view of a strip showing the clip blanks cut therefrom;

FIG. 7 is a top view of a bent clip;

FIG. 8 is a front view of the bent clip;

FIG. 9 is an edge front view of the bent clip; and

FIG. 10 is a rear view thereof.

DESCRIPTION OF THE INVENTION

The rake tooth generally designated 2 comprises an upper rigid metalic U-shaped clip generally designated 3 having a front portion 4 the rear portion 5 and a bottom or an intermediate bight portion 6. The clip has lateral edges 7 and 8 and an upwardly projecting lug 9 on the front portion 4.

The lug 9 is centered between the lateral edges 7 and 8 and has a curved upwardly convexed edge 10. The edge 10 merges into concave edge margins 11 and 12 at opposite sides thereof. The flowing curvelinear nature of the profile of the edges 10, 11, and 12 eliminates sharp corners which would provide a notch effect and therefore concentrate stresses thereat.

The rear portion comprises a pair of laterally spaced ears 14 and 15 disposed adjacent to the margins or lateral edges 7 and 8 of the clip. It will be seen that these ears taper outwardly and upwardly and that they have relatively wide inner ends or root portions 16 and 17 and at their upper ends terminate in upper points 18 and 19. A notch 20 is developed between the ears 14 and 15. It will be noted that the nadir 21 of the notch corresponds to the zenith or crest 22 of the surface 10 and that the profile of the inner edges 11a and 12a of the ears or projections 14 and 15 complemently fit the surfaces 11 and 12, since the rear portion of each blank 25 FIG. 6 is made simultaneously with the cutting of the front portion of the preceding blank as well seen in FIG. 6. The bottom side 28 of the bight portion 6 as well as portions of the outer sides 29 and 30 the front and rear portions 4 and 5 are bonded to an upper concave surface 31 of a block of elastomer material 32 which may be vulcanized rubber of well known form and characteristics as currently used for purposes of mounting hay rake teeth. The block of material 32 tapers downwardly and, centered within the block, there is embedded an upper root end portion 34 of a rake tooth designated 35. The root end portion 34 is provided with a plurality of flat anchoring areas 36 which bulge beyond the cylindrical periphery 37 of the tooth wire which is of metallic construction. The lower portion of the block is tapered downwardly at 38 and smoothly merges into the peripheral surface 37 of the rake tooth which has an elongated intermediate straight portion 39 terminating in a rearwardly angled working end portion 40.

The notch 20 in the rear of the clip provides an accommodation space for nut 42 which is threaded on the rear end 43 of bolt 44 which extends through aligned openings 45 and 46 in the wall of the tubular bar 47 which is of cylindrical shape of known type construction. The upper concavity 48 of the clip fits complementely against the bottom portion 49 of the rake bar having a cylindrical outer periphery 50. The bolt, preferably of a type known as a carriage bolt has a square portion 51 which fits complemently into a square hole 52 which is provided in the center of lug 9. This prevents the bolt from turning. The bolt has a head 54 which engages as at 55 against the front side 56 of the lug. When the nut 42 is drawn up the front side of the lug is butted by the rear of the bolt head which, in turn, causes the rear side 57 of the lug 10 to engage the forward side of the bar. The nut engages the rear side 58 of the bar. The nut 42 is nested within the notch 20 between the lugs 14 and 15 and since these lugs are tapered they are of reduced section at their free ends and thus bendable and may be easily hammered into engagement with the back side of the bar. Furthermore since the bolt has to only pass through the opening 52 and through the openings 45 and 46 the clip positions itself automatically against the bar since it is not restrained by a bolt passing through the rear portion as in previous constructions. Since the lugs are bendable these are easily hammered into place against the back side of the bar in order to obtain a tight fit to the bar. Also if the concavity in the clip should be too small and not fit the profile of the external periphery 50 of the bar these lugs can be pulled away.

In the making of the clip a flat strip of metal designated 75 is cut into discreet lengths by a suitable die having a cut die to shear the contour shown at 76. This simultaneously cuts the front portion of each blank and the rear portion of the succeeding blank. At the same time or prior to making the cut at 76 each blank may be punched at 77 to provide a locating hole for the clip to facilitate molding of the rubber block 32 thereon and the opening 52 may be punched simultaneously with hole 77 or the two holes punched during the shear. Thereafter each clip blank 25 is placed into a suitable form and bent into U-shape shown. It will be readily appreciated that a single cut thus obtains the front structure one clip in the rear structure of the second clip in that there is no waste of material and that the type of a cut provides smooth flowing contours for the front and rear end of each clip and also obtains the advantages heretofor brought out.

Having described a preferred embodiment of the invention it will be appreciated that various changes may be made based upon the foregoing disclosure.

What is claimed is:

1. Crop engaging tooth means comprising a rigid U-shaped clip having curved front, bottom and rear portions adapted to fit against the front, bottom and rear sides respectively on an associated tubular support bar, said front portion having a hole for admitting therethrough a bolt and nut assembly which is adapted to pass through aligned openings in the bar for securing the clip thereto, said rear portion comprising ears disposed adjacent to opposite lateral edges of the clip and defining an upwardly open notch therebetween for accommodating an adjacent end of said nut and bolt assembly therein, said assembly adapted to abut the bar directly at said end and said ears flanking said end of said assembly said ears being bendable and adapted to be bent transversely toward and away with respect to the front portion into close conformity to the opposing surface of the associated bar.

2. The invention according to claim 1 and a block of elastomeric material secured to the underside of said intermediate portion of the clip, and a rigid rake tooth secured at one end to the block, said tooth extending outwardly from the block.

3. The invention according to claim 2 wherein said block is bonded to the exterior side of said intermediate portion of said clip.

4. Crop engaging tooth means comprising a rigid U-shaped clip having curved front, bottom and rear portions adapted to fit against the front, bottom and rear sides respectively on an associated tubular support bar, said front portion having a hole for admitting therethrough a bolt and nut assembly which is adapted to pass through aligned openings in the bar for securing the clip thereto, said rear portion comprising ears disposed adjacent to opposite lateral edges of the clip and defining an upwardly open notch therebetween for accommodating an adjacent end of said nut and bolt assembly therein, said assembly adapted to abut the bar directly at said end and said ears flanking said end of said assembly and said front portion comprising an upwardly projecting lug centered between the lateral edges of said clip and in transverse alignment with said notch and having said hole therein.

5. The invention according to claim 1 wherein said ears taper upwardly to narrow distal ends and being deformable to fit complementally against said bar.

6. Crop engaging tooth means comprising a rigid U-shaped clip having curved front, bottom and rear portions adapted to fit against the front, bottom and rear sides respectively on an associated tubular support bar, said front portion having a hole for admitting therethrough a bolt and nut assembly which is adapted to pass through aligned openings in the bar for securing the clip thereto, said rear portion comprising ears disposed adjacent to opposite lateral edges of the clip and defining an upwardly open notch therebetween for accommodating an adjacent end of said nut and bolt assembly therein, said assembly adapted to abut the bar directly at said end and said ears flanking said end of said assembly and said front portion comprising an upwardly projecting lug substantially centered between said ears and therewith providing at least a three point contact for the clip with the associated bar.

7. Crop engaging tooth means comprising a rigid U-shaped clip having curved front, bottom and rear portions adapted to fit against the front, bottom and rear sides respectively on an associated tubular support bar, said front portion having a hole for admitting therethrough a bolt and nut assembly which is adapted to pass through aligned openings in the bar for securing the clip thereto, said rear portion comprising ears disposed adjacent to opposite lateral edges of the clip and defining an upwardly open notch therebetween for accommodating an adjacent end of said nut and bolt assembly therein, said assembly adapted to abut the bar directly at said end and said ears flanking said end of said assembly and said front portion comprising an upwardly projecting lug, and the contour of said notch being complementary to the edge contour of said lug.

* * * * *